US012686568B2

(12) United States Patent
Linder et al.

(10) Patent No.: US 12,686,568 B2
(45) Date of Patent: Jul. 21, 2026

(54) SEPARATING APPARATUS FOR TUBULAR OR BAR-SHAPED WORKPIECES

(71) Applicant: TRUMPF Werkzeugmaschinen SE + Co. KG, Ditzingen (DE)

(72) Inventors: Bernd Linder, Gammertingen (DE); Daniel Businger, Hettingen (DE); Martin Kindler, Burladingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 72 days.

(21) Appl. No.: 18/817,514

(22) Filed: Aug. 28, 2024

(65) Prior Publication Data

US 2024/0417185 A1     Dec. 19, 2024

Related U.S. Application Data

(63) Continuation of application No. PCT/EP2023/054881, filed on Feb. 27, 2023.

(30) Foreign Application Priority Data

Feb. 28, 2022     (DE) ..................... 10 2022 104 739.3

(51) Int. Cl.
B65G 47/14          (2006.01)
B65G 47/30          (2006.01)
(Continued)

(52) U.S. Cl.
CPC ......... B65G 47/1442 (2013.01); B65G 47/57 (2013.01); B65G 47/8846 (2013.01); B65G 47/30 (2013.01)

(58) Field of Classification Search
CPC .......................... B65G 47/1442; B65G 47/57; B65G 47/8846; B65G 47/30; B65G 2201/0217; B65G 2201/0276; B23K 37/00
See application file for complete search history.

(56) References Cited

U.S. PATENT DOCUMENTS 3,774,779 A     11/1973   White
4,417,491 A     11/1983   Uehara et al.
(Continued)

FOREIGN PATENT DOCUMENTS

DE          7122510 U       9/1971
DE          2403223 A1      7/1975
(Continued)

*Primary Examiner* — Mark A Deuble
(74) *Attorney, Agent, or Firm* — Laurence A. Greenberg; Werner H. Stemer; Ralph E. Locher

(57)          ABSTRACT

A separating apparatus for the controlled separation of tubular or bar-shaped workpieces has a pivot unit with a storage frame and a lifter. The storage frame is configured to receive a plurality of tubular or bar-shaped workpieces and the lifter is configured to lift the workpieces stored in the storage frame. A conveyor unit has a conveyor slide which forms an inclined conveyor plane for the tubular or bar-shaped workpieces. The pivot unit and the conveyor unit can be arranged in such a manner with respect to each other that a first pivot axis, about which the storage frame of the pivot unit is pivotable, extends along an upper end of the conveyor slide of the conveyor unit. There is also described a loading system with the separating apparatus and a method for using the separating apparatus.

9 Claims, 2 Drawing Sheets

(51) Int. Cl.
  *B65G 47/57* (2006.01)
  *B65G 47/88* (2006.01)

(56) References Cited

U.S. PATENT DOCUMENTS

| | | | | |
|---|---|---|---|---|
| 4,936,736 | A * | 6/1990 | Meier | B65G 47/1478 |
| | | | | 221/254 |
| 6,257,393 | B1 * | 7/2001 | Phelps | B65G 47/1471 |
| | | | | 198/456 |
| 6,401,906 | B1 * | 6/2002 | Franz | B65G 19/02 |
| | | | | 198/397.06 |
| 7,743,904 | B2 * | 6/2010 | Monti | B65G 47/1471 |
| | | | | 198/395 |
| 8,113,762 | B2 * | 2/2012 | Belik | E21B 19/15 |
| | | | | 414/746.4 |
| 9,701,485 | B2 * | 7/2017 | Fréchette | B65G 15/44 |
| 12,291,403 | B2 * | 5/2025 | Moser | B65G 47/29 |
| 2013/0233677 | A1 * | 9/2013 | Deflandre | B65G 47/1471 |
| | | | | 198/690.2 |
| 2022/0340372 | A1 | 10/2022 | Linder | |
| 2024/0253104 | A1 * | 8/2024 | Rupoli | B65G 47/8846 |

FOREIGN PATENT DOCUMENTS

| | | | |
|---|---|---|---|
| DE | 3210630 | A1 | 11/1982 |
| DE | 3245980 | A1 | 6/1984 |
| DE | 3403029 | A1 | 8/1985 |
| DE | 102020100459 | A1 | 7/2021 |
| EP | 2368818 | A1 | 9/2011 |
| GB | 1461712 | A | 1/1977 |
| JP | H11246031 | A | 9/1999 |

* cited by examiner

SEPARATING APPARATUS FOR TUBULAR OR BAR-SHAPED WORKPIECES

CROSS-REFERENCE TO RELATED APPLICATION

This application is a continuation, under 35 U.S.C. § 120, of copending International Patent Application PCT/EP2023/054881, filed Feb. 27, 2023, which designated the United States; this application also claims the priority, under 35 U.S.C. § 119, of German Patent Application DE 10 2022 104 739.3, filed Feb. 28, 2022; the prior applications are herewith incorporated by reference in their entirety.

FIELD AND BACKGROUND OF THE INVENTION

The present invention relates to the field of tube processing machines. In particular, the invention relates to a separating apparatus for the controlled separation of elongate workpieces, such as tubular or bar-shaped workpieces.

German published patent application DE 10 2020 100 459 A1 and its counterpart US 2022/0340372 disclose an apparatus for separating tubular or bar-shaped workpieces in which the workpieces can be transported from a pivotably supported storage rack or from a pivotably supported storage cartridge by means of a lifter via a loading edge onto a loading face.

SUMMARY OF THE INVENTION

It is an object of the invention to provide a novel separating apparatus which overcomes a variety of disadvantages of the heretofore-known devices and methods of this general type and which provides for an apparatus that is improved over the prior art. It is a particular object to optimize the device and process for a fully automated transfer of tubular or bar-shaped workpieces from a store into a processing machine.

With the above and other objects in view there is provided, in accordance with the invention, a separating apparatus for a controlled separation of tubular or bar-shaped workpieces, the separating apparatus comprising:

a pivot unit having a storage frame configured to receive a plurality of the tubular or bar-shaped workpieces and a lifter configured to lift the workpieces stored in said storage frame; and said storage frame of said pivot unit being pivotally mounted about a first pivot axis;

a conveyor unit forming a conveyor slide with an inclined conveyor plane for the tubular or bar-shaped workpieces;

said pivot unit and said conveyor unit to be arranged with respect to each other such that said first pivot axis of said storage frame extends along an upper end of said conveyor slide of said conveyor unit In other words, the objects of the invention are achieved by a separating apparatus, which may also be referred to as a separation apparatus or singling apparatus, for the controlled separation of tubular or bar-shaped workpieces. The separating apparatus comprises a pivot unit having a storage frame and a lifter, wherein the storage frame is constructed to receive a plurality of tubular or bar-shaped workpieces, and wherein the lifter is configured to lift the workpieces stored in the storage frame. Tubular or bar-shaped workpieces are intended in this instance to be understood to be workpieces which have a much greater length in comparison with the cross section thereof. Tubular or bar-shaped workpieces may in particular have a profile which is constant over the length thereof and may be produced from a substantially inflexible material, for example, a metal. The profile may be open or closed and further have round or angular contours. The pivot unit and the storage frame may each have an elongate form so that the workpieces which are also elongate, tubular or bar-shaped can be stored or transported therein. The storage frame may be securely integrated in the pivot unit or may be able to be inserted into the pivot unit or removed from the pivot unit as a storage cartridge. A base region of the storage frame or the storage cartridge may have recesses through which the lifter can lift the workpieces in the storage frame. The lifter may comprise a plurality of struts which are distributed over the length of the storage frame and which can in each case be displaced through a recess in the base region of the storage frame. The lifter or the struts of the lifter may form a support surface for the workpieces which are stored in the storage frame and which is parallel with a base face of the storage frame or which is inclined through a predetermined angle (for example, through approximately 10°) with respect to the base face of the storage frame.

The separating apparatus further comprises a conveyor unit having a conveyor slide which forms an inclined conveyor plane for the tubular or bar-shaped workpieces. The inclination of the conveyor plane is intended to be understood with respect to the horizontal. The conveyor slide may comprise a plurality of conveyor rails which are arranged beside each other along a long side of the conveyor device and together with the respective surface thereof form the conveyor plane.

The pivot unit and the conveyor unit can be arranged with respect to each other in such a manner that a first pivot axis about which the storage frame of the pivot unit can be pivoted extends along an upper end of the conveyor slide of the conveyor unit. Advantageously, the conveyor unit may be arranged at a predetermined position on an underlying surface, whilst the pivot unit is arranged so as to be able to be displaced relative to the conveyor unit on the underlying surface. Furthermore, the inclination of the conveyor plane may have a predetermined fixed angle with respect to the horizontal which may be, for example, between 20° and 50°, in particular approximately 35°. As a result of the predetermined angle and the fixed arrangement of the conveyor belt, the upper end of the conveyor slide may also preferably have a fixed position. The upper end of the conveyor slide extends along the length of the conveyor unit. The upper end of the conveyor slide is intended to refer to a region at the upper end of the conveyor slide which may extend, for example, up to 50 cm, preferably a maximum of 20 cm, even more preferably a maximum of 10 cm from the outermost upper end of the conveyor slide downward in the direction of the inclined conveyor plane.

As a result of the storage frame which can be pivotably supported about the first pivot axis and the lifter at one side and the conveyor slide at the other side tubular or bar-shaped workpieces can with a corresponding arrangement of the pivot unit with respect to the conveyor unit be separated automatically in a particularly simple manner. The separation of tubular or bar-shaped workpieces is intended to be understood to be the separation of individual or a comparatively small number of tubular or bar-shaped workpieces from a relatively large quantity of such workpieces. Workpieces which have been separated from the storage frame by means of transfer to the conveyor unit may, for example, be temporarily stored on a lower end of the conveyor slide for onward transfer to a processing machine.

According to a preferred variant, the conveyor unit may have a bridging element which is pivotably supported about a second pivot axis at the upper end of the conveyor slide and which is configured to bridge a gap between the upper end of the conveyor slide and the upper end of a lateral delimitation of the storage frame of the pivot unit. The storage frame thus has at least one lateral delimitation which—at least in a separation position of the pivot device-faces the conveyor unit. As already mentioned above, the storage frame may be in the form of a storage cartridge. The storage frame or the storage cartridge may, for example, be in the form of an elongate box having two short and two long lateral delimitations in the form of side walls or struts.

The bridging element may have a predetermined width. The width is intended to be understood to be the extent of the bridging element transversely relative to the length of the conveyor unit. The width of the conveyor element may, for example, be at least 5 cm. The bridging element may have a hook-like end with which it can engage behind the lateral delimitation of the storage frame. The conveyor unit may also have a plurality of bridging elements which are fitted along the length of the conveyor unit with spacing from each other. When the conveyor slide is formed from a plurality of conveyor belts, a bridging element can preferably be fitted at the upper end of each conveyor rail.

When the conveyor belt has at least one bridging element, the pivot unit and the conveyor unit may be able to be arranged relative to each other in such a manner that the first pivot axis of the pivot unit and the second pivot axis of the bridging element of the conveyor unit correspond to each other. In other words, in a separation position of the pivot unit the storage frame and the bridging element may be able to be pivoted about a common pivot axis. In this manner, a gap between the upper end of the conveyor-unit-side lateral delimitation of the storage frame and the upper end of the conveyor slide regardless of the inclination of the storage frame, or at least from an inclination of approximately 15° of the base face of the storage frame relative to the horizontal, can be bridged in a reliable and simple manner. The transfer of tubular or bar-shaped workpieces from the storage frame to the conveyor slide can thus be improved.

The upper end of the lateral delimitation of the storage frame may be able to be pivoted in a predetermined radius about the first pivot axis, which radius substantially corresponds to the width of the bridging element. It can thereby be ensured that the bridging element in the separation position of the pivot unit rests flush on the upper end of the lateral delimitation of the storage frame and reliably bridges the gap between the conveyor slide and the storage frame without protruding to a large extent at the inner side thereof over the lateral delimitation. The wording "substantially" is in this context intended to be understood to mean that the bridging element in a separation position of the pivot unit can be placed on the upper end of the lateral delimitation of the storage frame.

The upper end of the conveyor slide may also be configured without a bridging element. In this instance, it is particularly advantageous for the gap between the upper end of the conveyor slide and the lateral delimitation of the storage frame to be kept as small as possible (for example, less than 5 cm, preferably less than 2 cm, even more preferably less than 1 cm) in order to ensure a reliable separation of tubular or bar-shaped workpieces. For example, the upper end of the conveyor slide may be configured to be rounded, wherein the radius of the rounding extends about an axis which corresponds to the first pivot axis when the pivot unit is in the separation position.

The conveyor unit may comprise one or more carriers which are arranged so as to be able to be displaced along the conveyor plane in a conveying direction so that tubular or bar-shaped workpieces which are raised by the lifter out of the storage frame beyond the upper end of the lateral delimitation and reach the conveyor plane of the conveyor slide can be conveyed in a controlled manner along the conveyor plane. As a result of the carriers which can preferably be displaced in a motorized manner, the conveying speed of tubular or bar-shaped workpieces on the conveyor slide can be controlled regardless of the inclination of the conveyor slide or the conveyor plane. By means of the at least one carrier, tubular or bar-shaped workpieces can also be transported in the opposite direction from the lower end of the conveyor slide on the conveyor slide in an upward direction and pushed into a storage frame. Each of the carriers may comprise a corresponding sensor system which detects, for example, via weight change, how many tubular or bar-shaped workpieces bear on a carrier.

The conveyor slide may comprise a plurality of conveyor rails which together form the conveyor plane. A carrier may be displaceably arranged on each conveyor rail, wherein the carriers can preferably be moved synchronously with respect to each other.

The pivot unit of the separating apparatus may have a base module and a pivotable pivot module. In this instance, the storage frame may be arranged on the pivot module. The base module provides support for the pivot movement of the pivot module. Preferably, the pivot module may have an at least partially curved outer contour which extends in a radius about the first pivot axis. Furthermore, the pivot unit may have a drive having a drive wheel which is arranged on the base module and which in order to pivot the pivot module can be brought into engagement with the curved outer contour of the pivot module or is in engagement therewith. In particular, the pivot drive may be in the form of a rack and pinion drive, wherein on the curved outer contour of the pivot module a correspondingly curved toothed rack is fitted and wherein the drive wheel is in the form of a gear or a pinion.

The base module may further have a curved groove, which extends in a radius, in particular concentrically with respect to the curved outer contour, about the first pivot axis. In this instance, there may be arranged on the storage frame rollers which engage in the curved groove of the carrier frame and which act as a support for the pivot module. The weight of the pivot module is in this instance transmitted via the rollers to the base module. The drive concept described here promotes a particularly slim construction type of the pivot unit. At the same time, large loads can be moved with the rack and pinion drive.

The pivot unit may be displaceable. To this end, corresponding wheels may be arranged on the base module of the pivot unit. In particular, the pivot unit may be able to be displaced on the wheels in a direction transverse relative to the conveyor unit. For example, the pivot unit may be provided in a loading position remote from the conveyor unit with a storage cartridge which is filled with tubular or bar-shaped workpieces, wherein the pivot module is pivoted into a loading position (for example, horizontal orientation of the storage cartridge). In order to separate the tubular or bar-shaped workpieces, the pivot unit may be moved close to the conveyor unit into the separation position in which the first pivot axis extends in the upper end of the conveyor slide. In the separation position, the pivot module may be pivoted through, for example, 35° from an in particular horizontal orientation (for example, fitting orientation) into a separation orientation and one or more of the workpieces stored in the storage cartridge may be lifted or pushed by means of the lifter or by means of the lifters beyond the lateral delimitation of the storage cartridge onto the conveyor slide.

The separating apparatus may further comprise a control unit which is constructed to control a pivot movement of the pivot unit, a lifting movement of the lifter and a displacement movement of the at least one carrier in such an automated manner that a desired number of tubular or bar-shaped workpieces which are located in the storage frame are separated from the storage frame via the conveyor unit. Additionally or alternatively, the control apparatus may also be configured to convey tubular or bar-shaped workpieces from a lower end of the conveyor slide by means of the at least one carrier via the upper end of the conveyor slide into the storage frame.

The separating apparatus may further be provided with sensors which detect, for example, the filling level of workpieces in the storage frame or the presence of individual workpieces on the conveyor unit and which transmit it to the control unit 11.

In order to achieve the objective forming the basis of the invention, a loading system for loading a processing machine with tubular or bar-shaped workpieces is further provided. The loading system comprises a processing machine for processing tubular or bar-shaped workpieces. The processing machine may, for example, be a laser processing machine. The processing machine comprises a loading region, a processing region and an unloading region. The processing region may preferably comprise a laser processing unit which is configured in particular for cutting and/or welding tubular or bar-shaped workpieces. The loading system further comprises a separating apparatus according to one of the above-described variants. Furthermore, the loading system comprises a loading apparatus which is arranged between the conveyor unit of the separating apparatus and the loading region of the processing machine and which has at least one gripper which is configured to remove individual tubular or bar-shaped workpieces from the conveyor unit and to transfer them into the loading region of the processing machine.

The loading system may additionally comprise a shelf which is configured to receive storage frames or storage cartridges, wherein the pivot unit of the separating apparatus is configured to move back and forth between the shelf and the conveyor unit of the separating apparatus in order to be fitted on the shelf with a storage frame which is equipped with tubular or bar-shaped workpieces and to separate the workpieces in cooperation with the conveyor unit. The shelf may preferably comprise a loading and unloading system by means of which an in particular empty storage cartridge (storage frame) can be automatically removed from the pivot unit of the separating apparatus and be provided with a filled storage cartridge. In order to replace the storage cartridge, the pivot unit can be moved toward the shelf into a loading position.

In order to achieve the objective forming the basis of the invention, a method for loading a processing machine with tubular or bar-shaped workpieces using a separating apparatus as described above is further provided, wherein the conveyor unit of the separating apparatus has at least one carrier. The method comprises in a first step equipping the storage frame with tubular or bar-shaped workpieces. To this end, for example, the pivot unit may be moved toward a shelf and as described above be charged with a filled storage cartridge by means of a loading and unloading system. Alternatively, the storage frame may also be charged whilst the pivot unit is in the separation position directly beside the conveyor unit, wherein in this instance, in order to load the storage frame, the storage frame can be pivoted into an in particular horizontal loading orientation.

When the storage frame is loaded and the pivot unit is at the separation position, the method comprises in a second step pivoting the pivot unit from the loading orientation into a separation orientation. To this end, the pivot unit or the pivot module of the pivot unit can be pivoted through a predetermined angle of inclination, for example, between 20° and 50°, for example, through approximately 35°.

In a third step, the method comprises lifting, by means of the lifter, the tubular or bar-shaped workpieces in the storage frame until at least one of the tubular or bar-shaped workpieces bears on the at least one carrier. In other words, the tubular or bar-shaped workpieces which are stored in the storage frame are lifted by the lifter and moved along the lateral delimitation, which is also inclined as a result of the inclination of the storage frame, of the storage frame until at least one of the workpieces is transferred over the upper end of the lateral delimitation onto the conveyor unit and is held by the at least one carrier.

In a fourth step, the method involves moving the at least one carrier down along the conveyor plane of the conveyor unit. For controlled separation of the workpieces, the at least one carrier may, for example, be moved down on the conveyor slide until a predetermined number of tubular or bar-shaped workpieces are located on the conveyor slide. Subsequently, the lifter can be lowered again until the remaining workpieces are located at least below the upper end of the lateral delimitation. Subsequently, the carriers can be moved further along the conveyor slide downward into a lower end position in which the separated workpieces can be removed for onward transfer into a processing machine.

Of course, the separating apparatus can also be used to unload tubular or bar-shaped workpieces from the loading region of a tube processing machine. In this instance, the method steps described above can be carried out in the reverse order, wherein the orientation of the pivot unit is in this instance incidental. It is sufficient in principle for the tubular or bar-shaped workpieces which are located on the conveyor slide to be pushed by means of the carrier or by means of the carriers beyond the upper end of the conveyor slide into the storage frame. In this instance, it may be advantageous for the lifter to be located in a lowered position so that the workpieces can be moved into the storage frame and are not blocked by workpieces which are raised in the storage frame. After the tubular or bar-shaped workpieces have been returned into the storage frame, the pivot unit may, for example, be moved from the separation position into an unloading position onto a shelf on which the storage frame, which in this instance may be in the form of a storage cartridge, can be removed and moved into the shelf. During unloading, the pivot unit may preferably be pivoted into a horizontal orientation.

Other features which are considered as characteristic for the invention are set forth in the appended claims.

Although the invention is illustrated and described herein as being embodied in a separating apparatus for tubular or bar-shaped workpieces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

In the figures, elements which are functionally or structurally identical are given the same reference numerals for the sake of simplicity.

DETAILED DESCRIPTION OF THE INVENTION

Figures 1A, 1B, 2:
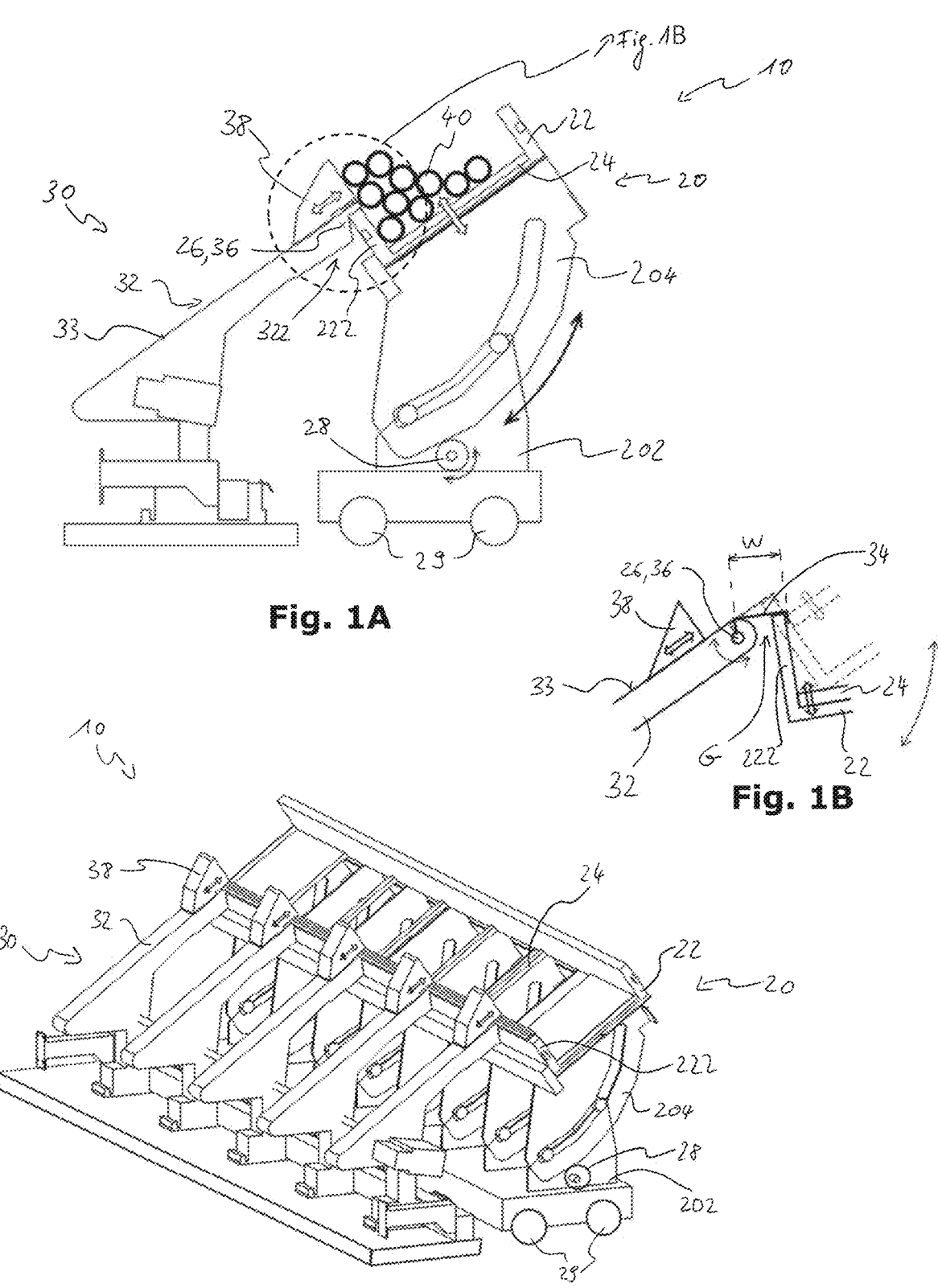
FIG. 1A is a side view of a separating apparatus according to the invention for separating tubular or bar-shaped workpieces.
FIG. 1B is a partial view of the separating apparatus of FIG. 1A at the interface between the pivot unit and conveyor unit.
FIG. 2 is an isometric view of the separating apparatus according to FIG. 1A.

In FIGS. 1A and 2, a separating apparatus 10 is illustrated in each case as a side view (FIG. 1A) and as an isometric view (FIG. 2). The apparatuses 10 illustrated are constructed identically, wherein in the illustration according to FIG. 1A tubes 40 are additionally received in the separating apparatus 10.

The separating apparatus 10 has a pivot unit 20 having a storage frame 22 and a lifter 24. The storage frame 22, which may be a cassette, is configured to receive a plurality of tubular or bar-shaped workpieces 40 and the lifter 24 is configured to lift the workpieces 40 which are stored in the storage frame 22 in the storage frame 22. The storage frame 22 may be in the form of a removable, substantially box-like storage cartridge 22 which has on its base recesses through which corresponding displaceably supported lifters 24 can be displaced (cf. FIG. 2). The separating apparatus 10 further has a conveyor unit 30 having a conveyor slide 32 which forms an inclined conveyor plane 33 for the tubular or bar-shaped workpieces 40. In the variant illustrated, the conveyor slide 32 is composed of a plurality of conveyor rails which are arranged beside each other along the length of the conveyor unit. On each of the conveyor rails there is fitted a carrier 38 which can be displaced along the conveyor plane 33. The pivot unit 20 also has a plate-like construction in which structurally identical modules are arranged beside each other along the length of the pivot unit 20. This construction type enables an easy lengthwise adaptability of the separating apparatus 10. For example, the pivot unit 20 and the conveyor unit 30 may each have approximately a length of 6.5 m, or, according to a larger embodiment, a length of from approximately 8 m to approximately 12 m. As a result of the number and the spacing of structurally identical elements which are arranged beside each other, inter alia the weight of the separating apparatus and the load-bearing capacity thereof can also be influenced. The separating apparatus 10 can be configured to separate, in particular metal, tubular or bar-shaped workpieces 40 having an overall weight of at least one ton. That is to say, in the storage frame 22, for example, tubes having an overall weight of from 3 to 4 tons may be stored.

The pivot unit 20 has a base module 202 and a pivot module 204, wherein the pivot module 204 has a curved groove which is supported in each case on two carrier wheels which are secured to the base module 202. On the base module 202 there are further arranged wheels 29 on which the pivot unit 20 can be displaced relative to the conveyor unit 30. The pivot movement of the pivot module 204 is produced by means of a rack and pinion drive, wherein on the base module 202 there is arranged a drive having a pinion 28 which engages in a curved toothed rack of the pivot module 204 which extends in a radius about a first pivot axis 26 of the pivot unit.

In FIGS. 1A and 2, the pivot unit 20 and the conveyor unit 30 are arranged in such a manner with respect to each other that the first pivot axis 26 about which the pivot module 204 can be pivoted with the storage frame 22 extends along an upper end 322 of the conveyor slide 32 of the conveyor unit 30. In FIGS. 1A and 2, the pivot unit 20 is in a transfer orientation. That is to say, the pivot module 204 with the storage frame 22 are pivoted through an angle with respect to the horizontal so that the tubular or bar-shaped workpieces 40 which are stored in the storage frame 22 are tilted over the upper edge of the lateral delimitation 222 onto the conveyor slide 32. As a result of the angle of the pivot movement and the translational movement of the lifter 24, the number of workpieces 40 which are intended to be separated can be precisely adjusted. In addition, the separation by the carrier or the carriers 38 can be regulated and/or controlled.

The conveyor unit 30 may have at the upper end 322 of the conveyor slide 32 a bridging element 34, as schematically illustrated in the detailed illustration in FIG. 1B. Preferably, there may be arranged on each conveyor rail a bridging element 34 which bridges a gap G between the upper end 322 of the conveyor slide 32 and the upper end of the lateral delimitation 222 of the storage frame 22 when the pivot unit 20 is in the separation position. To this end, the bridging element 34 or each bridging element 34 has a corresponding width W. The bridging element 34 may further be configured at the outer end thereof in a hook-like manner so that it can engage over the upper end of the lateral delimitation 222. The bridging element 34 is supported on the upper end 322 of the conveyor slide 32 in such a manner that a second pivot axis 36 about which the bridging element 34 can be pivoted coincides with the first pivot axis 26 of the pivot unit 20 when the pivot unit 20 is in the separation position.

Figure 3:
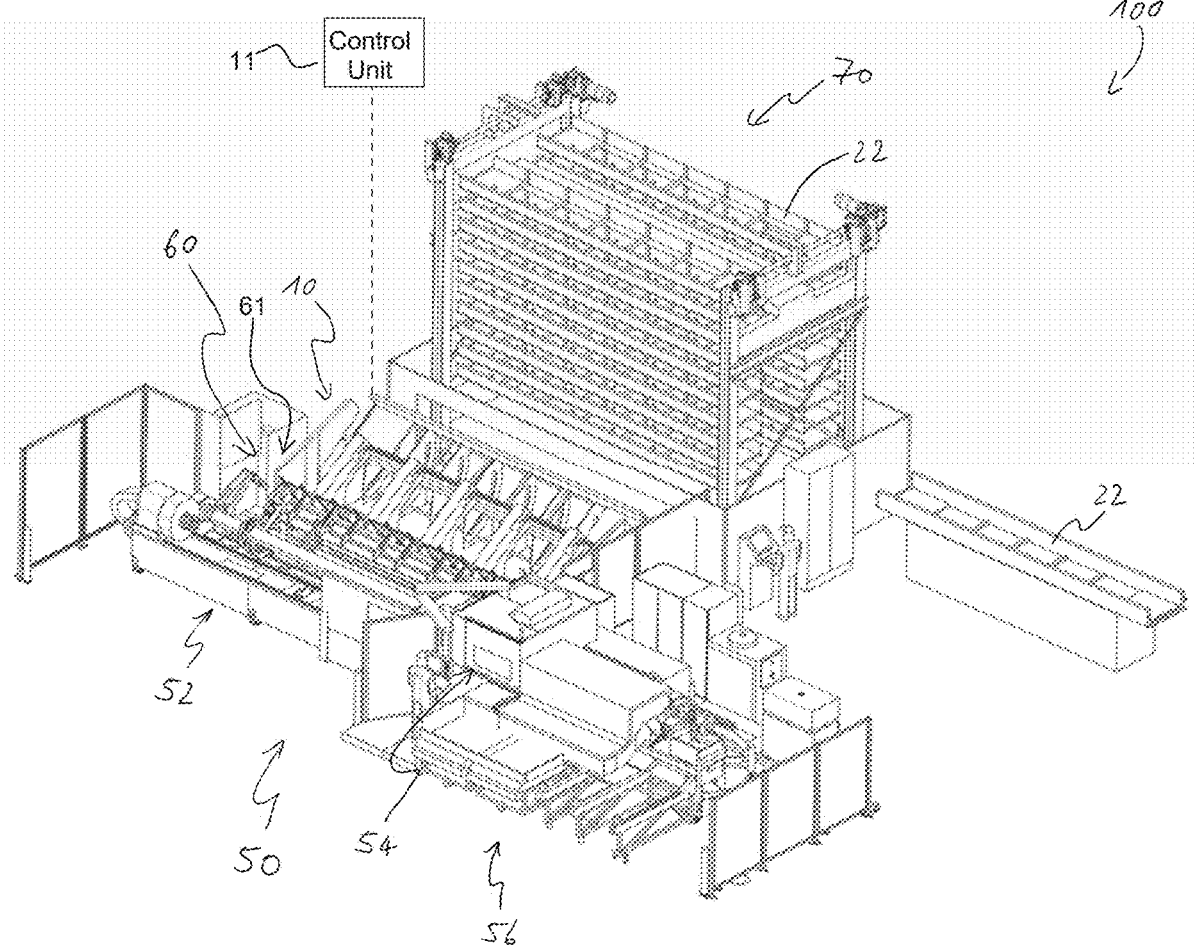
FIG. 3 is an isometric view of a loading system according to the invention for loading a processing machine with tubular or bar-shaped workpieces.

In FIG. 3, a loading system 100 according to the invention for loading and/or unloading a processing machine with tubular or bar-shaped workpieces 40 is illustrated. The loading system 100 comprises a processing machine 50, in particular a laser processing machine 50, for processing tubular or bar-shaped workpieces 40. The processing machine 50 has a loading region 52, a processing region 54 and an unloading region 56. The loading system further has a separating apparatus 10 as described above in connection with FIGS. 1A, 1B and 2. Between the conveyor unit 30 of the separating apparatus 10 and the loading region 52 of the processing machine 50, the loading system 100 further has a loading apparatus 60 having at least one gripper 61 which is configured to remove individual tubular or bar-shaped workpieces 40 from the conveyor unit 30 and to move them into the loading region 52 of the processing machine 50. At a side of the separating apparatus 10 remote from the processing, the loading system 100 further has a shelf 70 or storage rack in which a large number of storage cartridges or storage locations 22 are stored. The pivot unit 20 is displaceably supported in such a manner that it can move back and forth between the shelf 70 and the conveyor unit 30 in order to be loaded on the shelf 70 with a storage frame 22 which is charged with tubular or bar-shaped workpieces 40 and to separate the workpieces 40 in conjunction with the conveyor unit 30. Of course, workpieces 40 can also be conveyed from the loading region 52 of the processing machine 50 by means of the loading apparatus 60 and the separating apparatus 10 in the reverse direction into storage frames 22 and transferred into the shelf 70.

A typical loading operation is described below. By means of a loading and unloading system of the shelf 70, a storage cartridge 22 is loaded from the storage shelf 70 into the pivot unit 20 which to this end was moved toward the shelf 70 into a loading position and pivoted into the loading position. The storage cartridge 22 is moved by means of the pivot unit 20 toward the conveyor unit 30 until it has reached the separation position. As a result of subsequent rotation of the pivot module 204 of the pivot unit 20, the storage cartridge 22 is inclined in the direction of the conveyor slide 32. In combination with a translation by means of the lifter or the lifters 24 of the pivot unit 20, at least one tubular or bar-shaped workpiece 40 is separated by reaching the conveyor slide 32 of the conveyor unit 30 as a result of gravitational force via the bridging element 34. The at least one workpiece 40 is conveyed by the carriers 38 which are part of the conveyor unit along the conveyor plane 33 of the conveyor slide 32. At the lower end of the conveyor slide 32, a downstream loading apparatus 60 may receive a tubular or bar-shaped workpiece 40 and convey it into a processing machine 50. To this end, the carriers 38 can move into a position in which they do not impede the loading process of the loading apparatus 60.

Furthermore, the opposite conveying direction is conceivable. Tubular or bar-shaped workpieces 40 are placed by an external device, for example, the loading apparatus 60, on the conveyor slide 32 of the conveyor unit 30. Subsequently, the conveyor unit conveys the workpieces 40 by means of the carriers 38 in the direction of the pivot unit 20 and pushes it over the bridging element 34 into the storage cartridge 22, wherein the lifters 24 are preferably in a lowered position. The pivot module 204 of the pivot unit 20 can then be pivoted into a horizontal unloading position and moved to the shelf 70 into an unloading position, in which the storage cartridge 22 is removed by the loading and unloading system of the pivot unit 20 and moved into the shelf 70.

The following is a summary list of reference numerals and the corresponding structure used in the above description of the invention:

10 Separating apparatus
20 Pivot unit
202 Base module
204 Pivot module
22 Storage frame, cassette
222 Lateral delimitation
24 Lifter
26 First pivot axis
28 Drive wheel
29 Wheels of the pivot unit
30 Conveyor unit
32 Conveyor slide
33 Conveyor plane
322 Upper end of the conveyor slide
33 Conveyor plane
34 Bridging element
36 Second pivot axis
38 Carrier

40 Tubular or bar-shaped workpiece
50 Processing machine
52 Loading region of the processing machine
54 Processing region of the processing machine
56 Unloading region of the processing machine
60 Loading apparatus
70 Shelf
100 Loading system
G Gap
W Width of the bridging element

The invention claimed is:

1. A separating apparatus for a controlled separation of tubular or bar-shaped workpieces, the separating apparatus comprising:

a pivot unit having a storage frame configured to receive a plurality of the tubular or bar-shaped workpieces and a lifter configured to lift the workpieces stored in said storage frame; and said storage frame of said pivot unit being pivotally mounted about a first pivot axis;

a conveyor unit forming a conveyor slide with an inclined conveyor plane for the tubular or bar-shaped workpieces;

said pivot unit and said conveyor unit to be arranged with respect to each other such that said first pivot axis of said storage frame extends along an upper end of said conveyor slide of said conveyor unit; and said conveyor unit having a bridging element being pivotably supported about a second pivot axis at the upper end of said conveyor slide and being configured to bridge a gap between the upper end of said conveyor slide and an upper end of a lateral delimitation of said storage frame of said pivot unit;

said bridging element having a predetermined width; and said pivot unit and said conveyor unit being arranged with respect to each other such that the first pivot axis of said pivot unit and said second pivot axis of said bridging element of said conveyor unit correspond to one another.

2. The separating apparatus according to claim 1, wherein said upper end of said lateral delimitation of said storage frame is pivotable in a predetermined radius about the first pivot axis, and the predetermined radius substantially corresponds to the predetermined width of said bridging element.

3. The separating apparatus according to claim 1, wherein said conveyor unit comprises one or more carriers which are displaceably arranged along the conveyor plane in a conveying direction, enabling the tubular or bar-shaped workpieces that are lifted by the lifter from the storage frame via the upper end of said lateral delimitation and that reach the conveyor plane of said conveyor slide to be conveyed in a controlled manner along the conveyor plane.

4. The separating apparatus according to claim 1, wherein at least one of the following is true:

said pivot unit has a base module and a pivotable pivot module;

said storage frame is arranged on said pivot module;

said pivot module has an at least partially curved outer contour which extends in a radius about the first pivot axis; or said pivot unit has a drive with a drive wheel which is arranged on said base module and which, in order to pivot said pivot module, is in engagement with a curved outer contour of said pivot module.

5. The separating apparatus according to claim 1, wherein said pivot unit is a displaceable unit.

6. The separating apparatus according to claim 1, further comprising:

a control unit configured to control a pivoting movement of said pivot unit, a lifting movement of said lifter, and a displacement movement of at least one carrier that is displaceable along the conveyor plane to separate a desired number of the tubular or bar-shaped workpieces from the storage frame via the conveyor unit.

7. A loading system, comprising:

a processing machine for processing tubular or bar-shaped workpieces, said processing machine having a loading region, a processing region, and an unloading region;

a separating apparatus according to claim 1 for a controlled separation of the tubular or bar-shaped workpieces; and a loading apparatus arranged between the conveyor unit of said separating apparatus and said loading region of said processing machine, said loading apparatus having at least one gripper configured to remove individual tubular or bar-shaped workpieces from the conveyor unit and to transfer the workpieces into said loading region of said processing machine.

8. The loading system according to claim 7, further comprising:

a shelf for receiving storage frames; and wherein the pivot unit of said separating apparatus is configured to move back and forth between said shelf and the conveyor unit of said separating apparatus in order to be loaded on said shelf with a storage frame which is loaded with tubular or bar-shaped workpieces and to separate the workpieces in conjunction with said conveyor unit.

9. A method for loading a processing machine with tubular or bar-shaped workpieces, the method comprising:

providing a separating apparatus according to claim 1, wherein the conveyor unit of the separating apparatus has at least one carrier;

loading the storage frame with tubular or bar-shaped workpieces;

subsequently pivoting the pivot unit from a loading orientation into a separation orientation;

subsequently lifting, using the lifter, the tubular or bar-shaped workpieces in the storage frame until at least one of the tubular or bar-shaped workpieces bears on the at least one carrier; and subsequently lowering the at least one carrier along the conveyor plane of the conveyor unit.

* * * * *